United States Patent Office 3,218,173
Patented Nov. 16, 1965

3,218,173
CALCIUM-FORTIFIED MILK PROTEIN CONCENTRATE AND PROCESS FOR PRODUCING THE SAME
Morrison Loewenstein, Ashton, Ill., assignor to Crest Foods Co., Inc., Ashton, Ill., a corporation of Illinois
No Drawing. Filed Sept. 10, 1962, Ser. No. 222,639
9 Claims. (Cl. 99—19)

This invention relates to a process for the production of a powdered protein concentrate, and more specifically refers to such a process and to the product produced thereby having an increased calcium content.

Protein concentrates and especially those prepared from milk have become important as additives to fortify the protein content of many foods. They have also found use in the pharmaceutical field. One form of concentrate is generally prepared by the simultaneous precipitation of the protein content from skim milk under acid conditions. The curd thus formed contains 25% to 30% total solids, of which about 85% is protein in the form of a mixture of casein and lactalbumin, together with a small amount of beta lactoglobulin. This precipitate is sometimes referred to as a casein-lactalbumin fusion or coprecipitate. The major proportion of lactose and minerals originally present in the milk are carried off in the whey.

In the processes for coprecipitation of milk proteins, a proportion of the calcium originally present in the milk is lost. Additionally, the processes result in a decrease in density of the milk protein powder. This is often undesirable in that it results in increased transportation and handling difficulties, as well as unsuitability for certain uses.

It is an object of the invention to provide a process for the production of a dried milk protein concentrate and the product resulting therefrom having increased calcium content.

It is a further object to provide such a process which will produce a product having a higher density than those products obtained from known processes.

It is a further object to prepare a protein milk powder having a low water-binding capacity which is uniform from batch to batch.

It is a further object to provide a milk protein powder having a high density and which is nevertheless readily dispersible.

Other objects and advantages of the invention will become apparent from the description which follows.

Although the following disclosure offered for public dissemination is detailed to ensure adequacy and aid understanding, this is not intended to prejudice that purpose of a patent which is to cover each new inventive concept therein no mater how others may later disguise it by variations in form or additions or further improvements. The claims at the end hereof are intended as the chief aid toward this purpose; as it is these that meet the requirement of pointing out the parts, improvements, or combinations in which the inventive concepts are found.

In accordance with the present invention it has been found that a milk protein product may be prepared having the above stated desired properties by first removing the protein content from milk by precipitation. The precipitated protein curd is washed with water, separated from the whey, and broken up into very fine particles by passing through a high speed mill such as a Fitzmill. Lime (CaO) is then added to the curd in slurry form and thoroughly mixed. The slurry is then mixed with calcium salt such as calcium carbonate ($CaCO_3$) and moderately heated. After the reaction is complete, the slurry is once again passed through a high speed Fitzmill and subsequently spray-dried.

The starting materials for the present process may be any of the protein concentrates known in the art. The best products are obtained by utilizing a protein precipitate in curd form obtained from milk, and especially skimmed milk. The precipitated products from skim milk comprise a mixture of casein, lactalbumin, and a small amount of beta lactoglobulin. Individual protein materials such as casein or lactalbumin may also be used.

Many methods are known for the precipitation of milk proteins from skim milk. The preferred method is that disclosed in U.S. Patent No. 2,623,038, issued December 23, 1952. This method is described in detail in the example which follows.

*Example I.—Coprecipitation*

Into a suitable receptacle such a conventional cheese vat are placed approximately 5,000 pounds of freshly separated skimmed milk. The titratable acidity, as measured in terms of lactic acid, is adjusted downwardly to a point where the titratable acidity ranges between .04% and 0.11% by the addition of suitable alkalizing material such as sodium bicarbonate or soda ash, or a combination of the two materials. Other neutralizing agents which may be used either singly or in combination are NaOH, KOH, CaO, MgO, or other acid neutralizing chemicals. Temperatures in the range of from 32° F. to about 145° F. may be used, but neutralization should be carried out before the heat initiates precipitation of some of the whey proteins.

The neutralized milk is then heated to a temperature of from 180°–210° F., and preferably in the range of from about 190° to 194° F. Heating is discontinued and the milk brought to a quiescent state. A dilute acid is then added to accomplish the precipitation of the casein, lactalbumin, and beta lactoglobulin, in the form of a homogeneous coprecipitate. The acid used for precipitation may be an acid such as sulphuric, hydrochloric, lactic, acetic, hydroxy-acetic, phosphoric, citric or tartaric. Hydrochloric acid is the preferred acid. Sufficient acid should be added to effect complete precipitation, with a resultant clear whey. The pH should be from about 4.3 to about 4.9. The titratable acidity of the clear whey should be from about .20% to about .35%.

The whey resulting from the process is withdrawn from the vat. This process may be accomplished by first allowing sufficient time for the whey to separate by gravity, and subsequently carefully removing the whey. The whey may also be removed by mechanical means such as strainers, filters, or centrifugal devices. The precipitated curd is washed to remove excess acid, whey, soluble salt, and other non-proteinaceous materials. Either hot or cold wash water may be used. Various additives for aiding the washing process may be used. The number of washings and the volume of washwater required are dependent upon the degree of purity desired in the finished protein. The protein may be advantageously broken into small particles during the washing operation to facilitate the complete removal of the non-proteinaceous material.

*Example II.—Calcium reaction with wet curd*

The washed, purified, and precipitated protein curd as produced above in Example I may be further comminuted by a grinder or hammermill, with the addition of cold water, to reduce the particle size sufficiently to form a slurry of heavy cream-like consistency. The curd particles should preferably be 0.03 inch or less in diameter, and may contain a high proportion of moisture. The slurry thus formed is not a stable dispersion, but, upon standing, the solid phase may separate from the liquid phase.

While the slurry thus prepared is vigorously agitated, lime (CaO) NF powder is added thereto in an amount of about 1% of the total solids present. The lime may alternatively first be dispersed in water and the dispersion added to the protein slurry. A proportion of 1 pound of lime to 100 pounds of slurry solids is approximately equal to 150 grams of lime added to the slurry from each 1000 pounds of skim milk originally used, or 1 pound of lime to the slurry for 3000 pounds of milk. The addition of lime should be made while the slurry is at a temperature no greater than 120° F. The pH of the slurry at this point should be from about 7.0–7.4. In order to complete the reaction between the lime and the milk protein, it should be continued further for from 5 to 10 minutes.

After the reaction has been completed, calcium carbonate (USP precipitated powder) is added in an amount approximately equal to the amount of lime previously added. The amount may be varied where it is desired to modify the properties of the finished product. The addition of the calcium carbonate to the protein slurry should be preferably made at a temperature no greater than 120° F.

As a variation of the above described process, the lime-containing slurry may be pumped from the reaction tank into a second reaction tank, no heat being added during this period. While the slurry is flowing into the second reaction tank, the calcium carbonate is added thereto, either as a dry powder or as a liquid. In this case also, if the liquid form is used, agitation must be provided for in the supply tank to prevent the settling out of the insoluble calcium carbonate. Additionally, the slurry must be agitated vigorously as the calcium carbonate is added. The pH of the slurry, after the addition of both the lime and the calcium carbonate, should be in the range of from about 7.1 to about 7.5.

A sufficient reaction period should be provided after the addition of the calcium carbonate to permit the reaction with the protein to reach completion.

The addition of both the calcium oxide and the calcium carbonate should be carried out at temperatures no greater than 120° F. to prevent the formation of tough curds which would be difficult to dry as by spray drying.

When the reaction is complete, the protein slurry is heated to prepare it for drying. Heating may be accomplished either by the injection of live steam into the slurry, or by forcing the slurry into or through any of the conventional heat exchange devices such as tubular or plate heaters, jacketed vats, or kettles. Heating to a temperature prior to drying in the range of from 170° to 180° F. gives excellent results, although either higher or lower temperature may be used dependent upon the bacteriological and physical properties required in the finished product. The slurry should be as concentrated as possible at the time of heating in order to facilitate handling through the heating and drying devices. After the slurry has been heated, but before drying, it may advantageously be treated in a high speed comminuting machine such as a hammermill in order to reduce the particles to a size suitable for drying, and to render the particle size of the dried product more uniform.

Drying may be accomplished either by spray drying, drum drying, or foam mat drying. Although a final moisture content of from about 3 to about 6% is generally desired, it may be varied from this range in either direction where such properties are desired in the finished product.

In place of calcium carbonate, other edible calcium salts may be utilized for reaction with the protein in the second step of the present process. Among these are any of the calcium phosphates such as tricalcium phosphate, calcium gluconate, calcium tartrate, calcium citrate, calcium acetate, etc.

The products of the present invention have many advantages. Because they have low water-binding capacity, they are extremely useful for adding to baked goods to increase the protein content. Protein concentrates available on the market have water-binding capacities which are both high and variable. Consequently, it is often difficult to determine how much water need be added to the baking dough in order to obtain the proper consistency. Moreover, because of their high water-binding capacity, a large amount of water must be added to the dough in order to obtain a particular consistency. The presence of the excess water makes drying and baking considerably more difficult. Because of the low water-binding capacity of the present protein precipitates, only a minimum amount of water is required to obtain the desired dough consistency. Moreover, the water-binding capacity from one batch to another is so uniform, that the problems of varying consistency are eliminated.

The present protein concentrates also have a higher calcium content than prior art protein concentrates, since the calcium content is normally lost during processing. They are therefore extremely useful for the production of high calcium containing foods. They have a much higher density than do comparable prior art products. The problems of transportation are therefore greatly reduced.

I claim:

1. A process for the production of a milk protein concentrate having low water-binding capacity which comprises reacting in an aqueous slurry a milk protein precipitate in wet-curd form with calcium oxide in an amount equal to about 1% of the weight of the solids of said precipitate, adding an edible calcium salt in an amount approximately equal to the amount of calcium oxide used and further reacting the slurry mixture, and subsequently drying the resulting product.

2. A process according to claim 1 wherein said calcium salt is calcium carbonate.

3. A process according to claim 1 wherein said calcium salt is calcium phosphate.

4. A process according to claim 1 wherein said calcium salt is calcium gluconate.

5. A process according to claim 1 wherein said calcium salt is calcium tartrate.

6. A process according to claim 1 wherein said calcium salt is calcium citrate.

7. A process according to claim 1 wherein said calcium salt is calcium acetate.

8. A process for the production of a milk protein concentrate having low water-binding capacity which comprises comminuting a milk protein precipitate in wet-curd form until a slurry having a heavy cream-like consistency is formed, adding calcium oxide in an amount of about 1% of the total solids present and reacting the contents of the slurry at a temperature not greater than about 120° F., until the pH of the slurry reaches a value in the range of about 7.0–7.4, adding calcium carbonate in an amount approximately equal to the amount of calcium oxide added and further reacting the contents of the slurry at a temperature not greater than about 120° F., until a pH of about 7.1–7.5 is attained, and subsequenty spray-drying the resulting product.

9. A milk protein concentrate in granular form having low water-binding capacity prepared by reacting in an aqueous slurry a milk protein precipitate in wet-curd form with calcium oxide in an amount equal to about 1% of the weight of the solids of said precipitate, adding an edible calcium salt in an amount approximately equal to the amount of calcium oxide used and further reacting the slurry mixture, and subsequently drying the resulting product.

References Cited by the Examiner

UNITED STATES PATENTS

| | | | |
|---|---|---|---|
| 1,167,434 | 1/1916 | Reuter | 99—20 X |
| 1,962,552 | 6/1934 | Dahlberg | 99—20 X |
| 2,401,919 | 6/1946 | Ender | 260—119 |
| 2,665,989 | 1/1954 | Howard et al. | 99—20 |
| 2,832,685 | 4/1958 | Scott | 99—20 |

OTHER REFERENCES

Peter et al.: Industrial and Engineering Chemistry, vol. 22, p. 1124, October 1930, reprint, pp. 1 to 12.

A. LOUIS MONACELL, *Primary Examiner.*

ABRAHAM H. WINKLESTEIN, *Examiner.*